US009931620B2

(12) United States Patent
Prasad et al.

(10) Patent No.: US 9,931,620 B2
(45) Date of Patent: Apr. 3, 2018

(54) STABILIZED METAL-EXCHANGED SAPO MATERIAL

(71) Applicant: BASF Corporation, Florham Park, NJ (US)

(72) Inventors: Subramanian Prasad, Edison, NJ (US); Martin C. Wende, Westfield, NJ (US); Jaya L. Mohanan, Edison, NJ (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 15/720,567

(22) Filed: Sep. 29, 2017

(65) Prior Publication Data

US 2018/0021764 A1    Jan. 25, 2018

Related U.S. Application Data

(62) Division of application No. 14/205,704, filed on Mar. 12, 2014, now Pat. No. 9,802,182.

(60) Provisional application No. 61/778,827, filed on Mar. 13, 2013.

(51) Int. Cl.
| | |
|---|---|
| *B01J 29/06* | (2006.01) |
| *B01J 27/182* | (2006.01) |
| *B01J 29/85* | (2006.01) |
| *B01D 53/94* | (2006.01) |
| *B01J 29/70* | (2006.01) |
| *B01J 29/76* | (2006.01) |
| *B01D 53/86* | (2006.01) |
| *B01J 37/02* | (2006.01) |
| *B01J 35/00* | (2006.01) |
| *B01J 35/04* | (2006.01) |

(52) U.S. Cl.
CPC .......... *B01J 29/85* (2013.01); *B01D 53/8625* (2013.01); *B01D 53/8628* (2013.01); *B01D 53/9413* (2013.01); *B01D 53/9418* (2013.01); *B01J 29/7065* (2013.01); *B01J 29/763* (2013.01); *B01J 35/002* (2013.01); *B01J 37/0246* (2013.01); *B01D 2255/2065* (2013.01); *B01D 2255/20738* (2013.01); *B01D 2255/20746* (2013.01); *B01D 2255/20753* (2013.01); *B01D 2255/20761* (2013.01); *B01D 2255/50* (2013.01); *B01J 35/04* (2013.01); *B01J 2229/183* (2013.01); *B01J 2229/186* (2013.01); *B01J 2229/24* (2013.01); *B01J 2229/30* (2013.01); *B01J 2229/38* (2013.01)

(58) Field of Classification Search
CPC ...... B01J 29/87; B01J 35/04; B01J 2229/186; B01D 53/9418; B01D 53/8628; B01D 2255/50; B01D 58/8625; B01D 53/9413
USPC .......... 502/60, 66, 74, 85, 86, 214
See application file for complete search history.

(56) References Cited

U.S. PATENT DOCUMENTS

| | | | |
|---|---|---|---|
| 2,930,447 A | 3/1960 | Barrer | |
| 4,503,024 A | 3/1985 | Bourgogne et al. | |
| 4,960,504 A | 10/1990 | Pellet et al. | |
| 5,552,361 A | 9/1996 | Rieser et al. | |
| 5,589,153 A | 12/1996 | Garces et al. | |
| 6,051,745 A | 4/2000 | Wu et al. | |
| 6,897,180 B2 | 5/2005 | Mees et al. | |
| 7,193,122 B2 | 3/2007 | Mees et al. | |
| 7,998,443 B2 | 8/2011 | Anderson et al. | |
| 2003/0004056 A1 | 1/2003 | Mees et al. | |
| 2003/0149321 A1* | 8/2003 | Mees ...................... B01J 29/85 585/640 |
| 2004/0116282 A1 | 6/2004 | Mees et al. | |
| 2009/0196812 A1 | 8/2009 | Bull et al. | |
| 2010/0256316 A1 | 10/2010 | Vermeiren et al. | |
| 2010/0267548 A1 | 10/2010 | Anderson et al. | |
| 2010/0292071 A1 | 11/2010 | Ferrini et al. | |
| 2011/0165051 A1 | 7/2011 | Beutel et al. | |
| 2013/0005563 A1 | 1/2013 | Matsuo et al. | |

FOREIGN PATENT DOCUMENTS

| | | |
|---|---|---|
| CN | 100358805 | 1/2008 |
| CN | 100377784 | 4/2008 |
| CN | 102614910 | 8/2012 |
| EP | 0163467 | 12/1985 |
| GB | 1062064 | 3/1967 |
| JP | 07155614 | 6/1995 |
| WO | WO 01/36094 | 5/2001 |
| WO | WO 03/059849 | 7/2003 |
| WO | WO 2008/077590 | 7/2008 |
| WO | WO 2008/106519 | 9/2008 |

(Continued)

OTHER PUBLICATIONS

Buchholz, A. et al., Sequential Steps of Ammoniation of the Microporous Silicoaluminophosphates H-SAPO-34 and H-SAPO-37 Investigated by In Situ CF MAS NMR Spectroscopy, J. Phys. Chem. B, vol. 108 No. 10 2004, 3107-3113.

Deka, Upakul et al., Local Environment and Nature of Cu Active Sites in Zeolite-based Catalysts for the Selective Catalytic Reduction of NOR, ACS Catalysis Jan. 22, 2013, 35 pages.

Ishihara et al., "Copper Ion-Exchanged SAPO-34 as a Thermostable Catalyst for Selective Reduction of NO with $C_3H_6$," *Journal of Catalysis*, 1997, vol. 169, pp. 93-102.

Lopez et al., "A study of the influence of the synthesis conditions upon the catalytic properties of silicoaluminophosphate molecular sieves", Topics in Catalysis 10 (2002), pp. 65-71.

(Continued)

*Primary Examiner* — Elizabeth Wood
(74) *Attorney, Agent, or Firm* — Womble Bond Dickinson (US) LLP (57) ABSTRACT

Described are catalyst materials and catalytic articles comprising a metal exchanged SAPO material comprising a plurality of substitutional sites consisting essentially of Si(4Al) sites and substantially free of Si(0Al) sites. The materials and catalytic articles are useful in methods and systems to catalyze the reduction of nitrogen oxides in the presence of a reductant.

11 Claims, 5 Drawing Sheets

(56) References Cited

FOREIGN PATENT DOCUMENTS

| WO | WO 2008/132452 | 11/2008 |
|----|----------------|---------|
| WO | WO 2009/099937 | 8/2009  |

OTHER PUBLICATIONS

Mees, F.D.P. et al., Improvement of the hydrothermal stability of SAPO-34, Chem. Commun. 2003, 44-45.

Tan et al., "Crystallization and Si incorporation mechanisms of SAPO-34", Microporous and Mesoporous Materials 53 (2003), pp. 97-108.

Wang et al., "The Influence of Silicon on the Catalytic Properties of Cu/SAPO-34 for $NO_x$ Reduction by Ammonia-SCR," *Applied Catalysis B: Environmental*, 2012, vol. 127, pp. 137-147.

Xu et al., "Synthesis of SAPO-34 with only Si(4A1) species: Effect of Si contents on Si incorporation mechanism and Si coordination environment of SAPO-34", Microporous and Mesoporous Materials 115 (2008), pp. 332-337.

Ying, Ouyang et al., Study on the Deactivation of SAPO-34 under Hydrothermal Condition, Research Institute of Petroleum Processing, SINOPEC, Beijing 2009, 4 pages.

\* cited by examiner

STABILIZED METAL-EXCHANGED SAPO MATERIAL

CROSS-REFERENCE TO RELATED APPLICATIONS

This application is a divisional of U.S. patent application Ser. No. 14/205,704, filed Mar. 12, 2014 now U.S. Pat. No. 9,802,182, which claims the benefit of priority under 35 U.S.C. §119(e) to U.S. Provisional Patent Application No. 61/778,827, filed on Mar. 13, 2013, both of which are hereby incorporated by reference in their entirety.

TECHNICAL FIELD

The present invention pertains to the field of selective catalytic reduction catalyst materials. More particularly, embodiments of the invention relate to a stabilized metal-exchanged SAPO material.

BACKGROUND

Molecular sieves such as zeolites have been used extensively to catalyze a number of chemical reactions in refinery and petrochemical reactions, and catalysis, adsorption, separation, and chromatography. For example, with respect to zeolites, both synthetic and natural zeolites and their use in promoting certain reactions, including conversion of methanol to olefins (MTO reactions) and the selective catalytic reduction (SCR) of nitrogen oxides with a reductant such as ammonia, urea or a hydrocarbon in the presence of oxygen, are well known in the art. Zeolites are crystalline materials having rather uniform pore sizes which, depending upon the type of zeolite and the type and amount of cations included in the zeolite lattice, range from about 3 to 10 Angstroms in diameter. Zeolites having 8-ring pore openings and double-six ring secondary building units, particularly those having cage-like structures have recently found interest in use as SCR catalysts. A specific type of zeolite having these properties is chabazite (CHA), which is a small pore zeolite with 8 member-ring pore openings (~3.8 Angstroms) accessible through its 3-dimensional porosity. A cage like structure results from the connection of double six-ring building units by 4 rings.

Catalysts employed in the SCR process ideally should be able to retain good catalytic activity over the wide range of temperature conditions of use, for example, 200° C. to 600° C. or higher, under hydrothermal conditions. Hydrothermal conditions are often encountered in practice, such as during the regeneration of a soot filter, a component of the exhaust gas treatment system used for the removal of particles.

Selective Catalytic Reduction, using ammonia or ammonia precursor as reducing agent is believed to be the most viable technique for the removal of nitrogen oxides from the exhaust of diesel vehicles. In typical exhaust, the nitrogen oxides are mainly composed of NO (>90%), so the SCR catalyst favors the conversion of NO and $NH_3$ into nitrogen and water. Two major challenges in developing catalysts for the automotive application of the ammonia SCR process are to provide a wide operating window for SCR activity, including low temperatures of from 200° C. and higher and improvement of the catalyst's hydrothermal stability for temperatures above 500° C. As used herein hydrothermal stability refers to retention of a material's capability to catalyze the SCR of $NO_x$, with a preference for the retention to be at least 85% of the material's $NO_x$ conversion ability prior to hydrothermal aging.

Metal-promoted zeolite catalysts including, among others, iron-promoted and copper-promoted zeolite catalysts, where, for instance, the metal is introduced via ion-exchange, for the selective catalytic reduction of nitrogen oxides with ammonia are known. Iron-promoted zeolite beta has been an effective catalyst for the selective reduction of nitrogen oxides with ammonia. Unfortunately, it has been found that under harsh hydrothermal conditions, such as reduction of $NO_x$ from gas exhaust at temperatures exceeding 500° C., the activity of many metal-promoted zeolites, such as Cu and Fe versions of ZSM-5 and Beta, begins to decline. This decline in activity is believed to be due to destabilization of the zeolite such as by dealumination and consequent loss of metal-containing catalytic sites within the zeolite.

To maintain the overall activity of $NO_x$ reduction, increased levels of the washcoat loading of the iron-promoted zeolite catalyst must be provided. As the levels of the zeolite catalyst are increased to provide adequate $NO_x$ removal, there is an obvious reduction in the cost efficiency of the process for $NO_x$ removal as the costs of the catalyst rise.

Due to the considerations discussed above, there is a desire to prepare materials which offer improved low temperature SCR activity and/or improved hydrothermal durability over existing zeolitic materials, for example, catalyst materials which are stable at temperatures up to at least about 650° C. and higher, for example in the range of about 700° C. to about 800° C. and up to about 900° C. Moreover, since diesel engines operate under transient conditions, there is a desire to provide materials that exhibit high performance over a wide temperature range, from as low as 200° C. up to about 600° C. Thus, while existing technologies provide high temperature performance, there is a need for materials can offer low temperature performance in predominantly NO feeds combined with hydrothermal stability. Low temperature performance is important for cold start and low engine load conditions.

While silicoaluminophosphate (SAPO) materials have attracted some interest for SCR of $NO_x$, one limitation of these materials is that these materials can become unstable when exposed to humid or moist environments at temperatures below 100° C. Thus, it would be desirable to provide a catalyst material that can provide excellent low temperature SCR of $NO_x$ to meet current governmental (for example, Euro 6) $NO_x$ regulations. Additionally, it would be desirable to provide an SCR catalyst that is not prone to extensive deactivation under moist conditions at low temperature.

SUMMARY

Embodiments of a first aspect of the invention are directed to a selective catalytic reduction catalyst material comprising a metal exchanged, stabilized SAPO material. In one or more embodiments, the metal exchanged, stabilized SAPO material comprises a plurality of substitutional sites consisting essentially of Si(4Al) sites and substantially free of Si(0Al) sites. In one or more embodiments, the metal is selected from Cu, Fe, Co, Ce, and Ni. In one or more embodiments, the catalyst material is effective to catalyze the selective catalytic reduction of nitrogen oxides in the presence of a reductant at temperatures between 200° C. and 600° C.

According to one or more embodiments, the plurality of substitutional sites includes less than 5% Si(0Al) sites. In a specific embodiment, the plurality of substitutional sites includes less than 1% Si(0Al) sites.

In one or more embodiments, the SAPO material has a structure type selected from the group consisting of AEI, AFT, AFX, CHA, EAB, ERI, KFI, LEV, SAS, SAT, and SAV. In a specific embodiment, the SAPO material has the CHA structure type. In a very specific embodiment, the SAPO material is selected from the group consisting of SAPO-34, SAPO-44, and SAPO-47.

In one or more embodiments, the metal is Cu present at a loading in the range of 2 and 8% by weight.

A second aspect of the invention is directed to a selective catalytic reduction catalyst material comprising a metal exchanged, vapor phase ammonium-stabilized non-zeolitic molecular sieve material having the CHA structure type. In one or more embodiments, the metal is selected from the group consisting of Cu, Fe, Co, Ce, and Ni.

In one or more embodiments, the molecular sieve is a SAPO material having a major silicon-29 nuclear magnetic resonance (NMR) peak in the frequency shift range of −75 to −105 ppm with a full width at half maximum of 230±30 Hz.

In one or more embodiments, the metal is Cu present at a loading in the range of 2 and 8% by weight.

Figure 1:
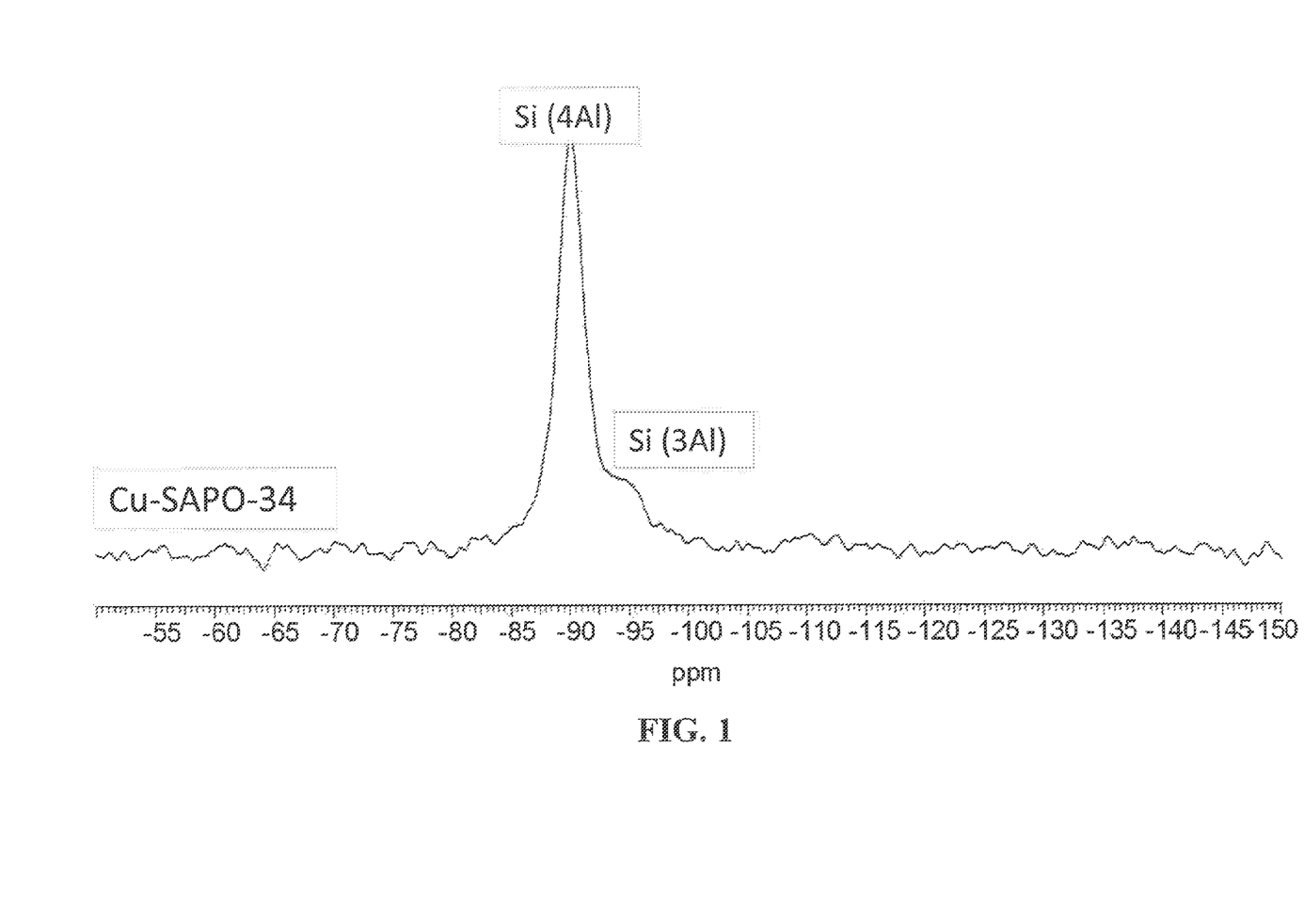
FIG. 1 is the Silicon-29 NMR spectrum of stabilized Cu-SAPO-34 according to one or more embodiments.

A third aspect of the invention is directed to a Cu-SAPO-34 material exhibiting a NMR spectrum as shown in FIG. 1.

A fourth aspect of the invention is directed to a catalytic article comprising a catalyst material comprising a metal exchanged, stabilized SAPO material in a washcoat deposited on a honeycomb substrate. In one or more embodiments, the metal exchanged SAPO material comprises a plurality of substitutional sites consisting essentially of Si(4Al) sites and substantially free of Si(0Al) sites. In one or more embodiments, the metal is selected from Cu, Fe, Co, Ce, and Ni. In one or more embodiments, the catalyst material is effective to catalyze the selective catalytic reduction of nitrogen oxides in the presence of a reductant at temperatures between 200° C. and 600° C.

In one or more embodiments, the honeycomb substrate of the catalytic article comprises a wall flow filter substrate. In other embodiments, the honeycomb substrate comprises a flow through substrate.

A further aspect of the invention is directed to an exhaust gas treatment system comprising the catalytic article according to one or more embodiments disposed downstream from a diesel engine and a reductant injector that adds a reductant to an exhaust gas stream from the engine.

A still further aspect of the invention is directed to a process for the reduction of oxides of nitrogen contained in a gas stream in the presence of oxygen. In one or more embodiments, the process comprises contacting an exhaust gas stream with ammonia and a catalyst material comprising a metal exchanged, stabilized SAPO material. In one or more embodiments, the metal exchanged SAPO material comprises a plurality of substitutional sites consisting essentially of Si(4Al) sites and substantially free of Si(0Al) sites. In one or more embodiments, the metal is selected from Cu, Fe, Co, Ce, and Ni. In one or more embodiments, the catalyst material is effective to catalyze the selective catalytic reduction of nitrogen oxides in the presence of a reductant at temperatures between 200° C. and 600° C.

An additional aspect of the invention is directed to a process for stabilizing a selective catalytic reduction catalyst material comprising a SAPO and an exchanged metal. In one or more embodiments, the process comprises exposing the SAPO to dry ammonia and ion exchanging the SAPO with a metal salt to provide a stabilized SAPO.

In one or more embodiments, the metal of the metal salt is selected from the group consisting of Cu, Fe, Co, Ce and Ni. In a specific embodiment, the metal comprises copper. In a specific embodiment, the SAPO comprises SAPO-34.

DETAILED DESCRIPTION

Before describing several exemplary embodiments of the invention, it is to be understood that the invention is not limited to the details of construction or process steps set forth in the following description. The invention is capable of other embodiments and of being practiced or being carried out in various ways.

With respect to the terms used in this disclosure, the following definitions are provided.

As used herein, the term "SAPO material" refers to a silico-alumino-phosphate molecular sieve, which is a porous crystalline molecular sieve wherein silicon is substituted into an aluminophosphate framework.

As used herein, the term "as-synthesized" refers to a SAPO material, e.g., SAPO-34 material, that is received from a commercial source and/or is prepared according to conventional synthetic techniques. The as-synthesized SAPO material is not stabilized, and, upon calcination and exposure to moisture, part of the framework hydrolyzes.

As used herein, the term "molecular sieves" refers to materials based on an extensive three-dimensional network of oxygen ions containing generally tetrahedral type sites and having a pore distribution. A zeolite is a specific example of a molecular sieve, which includes silicon and aluminum. As used herein, the terms "catalyst" and "catalyst species" refer to materials that promotes a reaction.

As used herein, the term "substrate" refers to the monolithic material onto a catalyst material is placed, typically in the form of a washcoat containing particles of the catalytic material. A washcoat is formed by preparing slurry containing a specified solids content (e.g., 30-90% by weight) of particles of the catalytic material in a liquid vehicle, which is then coated onto a substrate and dried to provide a washcoat layer.

As used herein, the term "washcoat" has its usual meaning in the art of a thin, adherent coating of a catalytic or other material applied as slurry to a substrate carrier material, such as a honeycomb-type carrier member, which is sufficiently porous to permit the passage of the gas stream being treated.

"Catalytic article" refers to an element that is used to promote a desired reaction. For example, a catalytic article may comprise a washcoat containing catalyst material on a substrate. "Catalyst material" or "catalytic material" refers to a composition that promotes a reaction, for example, a SAPO material exchanged with or containing a promoter metal such as copper which promotes the selective catalytic reduction of nitrogen oxides in the presence of a reductant.

Provided is an SCR catalyst material comprising a metal exchanged SAPO material comprising a plurality of substitutional sites consisting essentially of Si(4Al) sites and substantially free of Si(0Al) sites. As used herein, "substantially free of Si(0Al) sites" refers to The SCR catalyst material is a vapor phase ammonium-stabilized SAPO material exchanged with a promoter metal. The metal can be selected from Cu, Fe, Co, Ce, and Ni. Aspects of the invention are directed to a metal exchanged SAPO material, methods for its preparation, catalytic articles including a metal exchanged SAPO material, exhaust gas systems, and methods of abating pollutants from exhaust gases using such metal exchanged SAPO materials.

In one or more embodiments, the SAPO material has a structure type selected from the group consisting of AEI, AFT, AFX, CHA, EAB, ERI, KFI, LEV, SAS, SAT, and SAV. In one or more embodiments, the SAPO material has the CHA structure type. The SAPO material can be selected from SAPO-5, SAPO-11, SAPO-18, SAPO-34, SAPO-37, SAPO-44, SAPO-47. In one or more embodiments, the SAPO material is selected from the group consisting of SAPO-34, SAPO-44, and SAPO-47. In a specific embodiment, the SAPO material comprises SAPO-34.

In the conventional synthesis of SAPO materials, e.g., SAPO-34, ammonium exchange is done in an aqueous phase. However, exposure to moisture can deactivate the SAPO material. Accordingly, silicoaluminophosphate molecular sieves should not be stored in their calcined forms. Thus, in one or more embodiments, contact with moisture, and hence deactivation, can be avoided by an in-situ ammonium exchange in the vapor phase.

In an aluminophosphate network, such as is present in a SAPO material, silicon substitutes for phosphorus to generate isolated acid sites [Si(4Al)]. Even under ambient air, water attacks the acid sites in a stepwise manner resulting in desilication. The initial step is the adsorption of a water molecule and the subsequent hydrolysis of one of the SiOAl linkages. Further adsorption and hydrolysis of SiOAl linkages occur. As the SAPO material is hydrolyzed, deactivation of the material occurs.

An aspect of the invention pertains to a selective catalytic reduction catalyst material comprising a metal exchanged, vapor phase ammonium-stabilized non-zeolitic molecular sieve material having the CHA structure type, wherein the metal is selected from the group consisting of Cu, Fe, Co, Ce, and Ni. In one or more embodiments, the molecular sieve is a SAPO material having a silicon-29 nuclear magnetic resonance (NMR) peaks in the frequency shift range of −75 to −105 ppm. Typically a major peak is present in the silicon-29 NMR spectrum at about −90±1 ppm (full width at half maximum of 230±30 Hz) and a shoulder at −95±1 ppm (full width at half maximum of 300±50 Hz).

A specific embodiment of the invention is directed to a Cu-SAPO-34 material exhibiting the NMR spectrum as shown in FIG. 1. As illustrated in FIG. 1, the silicon-29 nuclear magnetic resonance (NMR) peak is in the frequency shift range of −75 to −105 ppm; typically a major peak is present at about −90±1 ppm (full width at half maximum of 230±30 Hz) and a shoulder is at −95±1 ppm (full width at half maximum of 300±50 Hz).

Figures 2A, 2B, 2C:
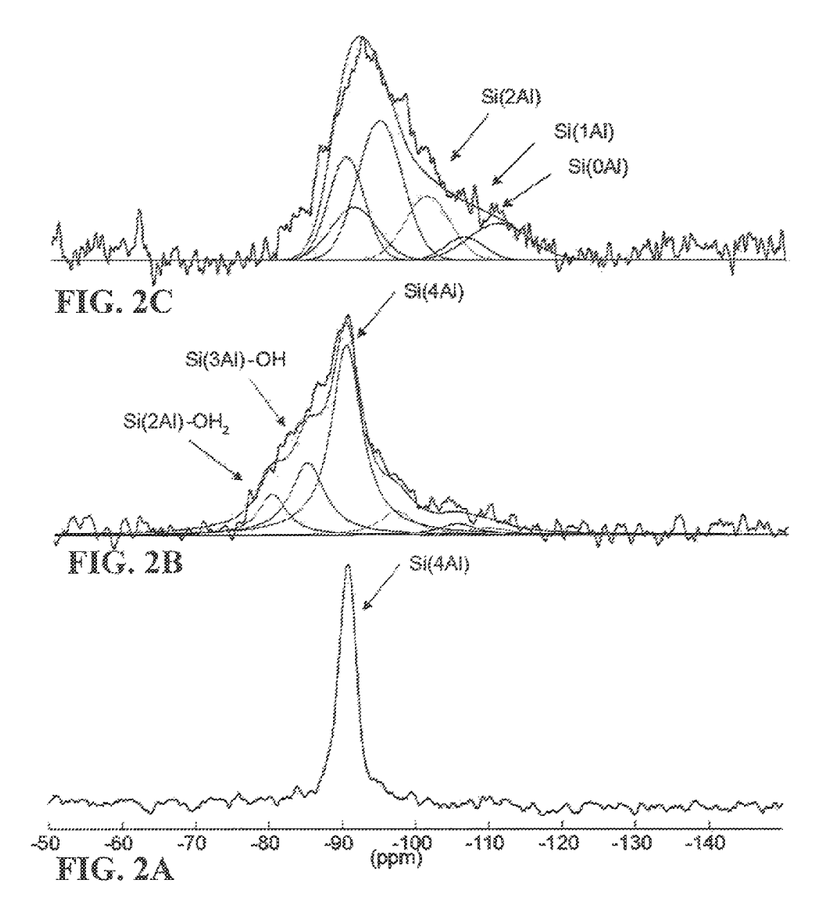
FIGS. 2A-2C the Silicon-29 NMR spectra of as-synthesized SAPO-34, calcined, hydrated and calcined, hydrated, and dried at 100° C.

In the as-synthesized SAPO-34 material, the silicon-29 nuclear magnetic resonance (NMR) spectrum is dominated by Si(4Al) species, indicating the presence of mostly isolated acid sites. Referring to FIGS. 2A-2C, when as-synthesized SAPO-34 is calcined and exposed to moisture, water attacks the acid sites resulting in desilication. There is stepwise formation of Si(3Al)—OH and Si(2Al)—OH$_2$ (FIG. 2B). The silicon-29 NMR spectrum indicates that partial hydrolysis of the material has occurred. NMR data also indicate that as-synthesized SAPO-34 in its calcined and hydrated state retains the spectral features even after one year (see FIG. 2B). Furthermore, when the hydrated sample is dried, the hydroxyl groups condense to form additional linkages to form Si(3Al), Si(2Al), Si(1Al), and, ultimately, Si(0Al) (see FIG. 2C). Without intending to be bound by theory, it is though that the loss of activity that is reported in the literature for Cu-SAPO-34 in SCR at temperatures <100° C. is due to the irreversible (and repetitive) hydrolysis and subsequent condensation to generate an inactive framework.

To produce a stabilized SAPO material, the as-synthesized SAPO material is subjected to an in situ vapor-phase ammonium stabilization process. The as-synthesized SAPO material, e.g., SAPO-34, is first freshly calcined, and the sample is then cooled. A low concentration of dry ammonia in an inert gas is passed through the freshly calcined catalyst bed/catalyst precursor to saturation. The now stable NH$_4$-SAPO material, e.g., NH$_4$-SAPO-34, generated through vapor phase is hydrophobic. The material is then ion-exchanged and converted to stabilized metal promoted SAPO materials, e.g. stabilized Cu-SAPO-34.

The stabilized metal exchanged SAPO material comprises a plurality of substitutional sites consisting essentially of Si(4Al) sites and substantially free of Si(0Al) sites. The metal can be selected from Cu, Fe, Co, Ce, and Ni. In one or more embodiments, the metal is Cu.

As used herein, the term "substitutional sites" refers to sites in the framework where silicon substitutes for phosphorus. The substitutional sites can be measured by magic-angle spinning (MAS) silicon-29 NMR. NMR determines local order (or disorder) of solids at an atomic level. Silicon-29 NMR can be used as a probe of structural features not readily accessible by other physical methods. For example, information of silicates and zeolites can be obtained from silicon-29 chemical shifts. The chemical shift decreases by 5-10 ppm when the elements such as Al, Ti, Ga, H, etc., substitute the framework silicates, and, hence, it can provide information on the next-nearest neighbor. For example, it is known that for the as-synthesized SAPO-34 material, the silicon-29 NMR produces a sharp peak of Si(4Al) at about −90±1 ppm, with some small peaks in the range of −95 ppm to −110 ppm, which indicate the presence of some silica islands (i.e. Si(0Al) sites). Silica-29 NMR can be used to identify the silica islands within the hydrolyzed SAPO-34 materials.

Conventional Synthesis of SAPO Materials

In what may be referred to as a conventional synthesis of a SAPO material, a reaction mixture is formed by combining phosphoric acid (H$_3$PO$_4$) with a mixture of a hydrated alumina oxide (a pseudo-boehmite phase) in water. To this mixture is added an aqueous solution of morpholine, and the mixture is stirred until homogenous. Then an aqueous solution of 30 wt % SiO$_2$ is added, and the mixture is stirred until homogeneous. The gel is hydrothermally treated at temperatures between 100-200° C. for a period of 8-48 hours. The crystallized material is cooled, filtered, and then dried to provide the crystalline as-synthesized SAPO material.

The as-synthesized SAPO material is calcined, resulting in direct formation of the H-form (proton form). The proton form of the catalyst is slurried in aqueous ammonium nitrate, then filtered and dried to provide the NH$_4$-SAPO material.

The NH$_4$-SAPO material is then ion exchanged using aqueous copper acetate (or a like metal salt) to produce the metal promoted SAPO material, e.g., Cu-SAPO-34.

Synthesis of SAPO Material According to Embodiments of the Invention

According to one or more embodiments, methods for the synthesis of selective catalytic reduction catalytic articles comprising a selective catalytic reduction catalyst comprising a metal exchanged SAPO material comprising a plurality of substitutional sites consisting essentially of Si(4Al) sites and substantially free of Si(0Al) sites are provided.

Generally, contact with moisture can be avoided and ammonium can be incorporated into an as-synthesized SAPO-34 immediately after the removal of template. Typically, the as-synthesized SAPO-34 (about 0.5 to 1 g) is placed in an enclosed reactor. The temperature is ramped up to 100° C. over 1 hour and kept at that temperature for 2 hours. The temperature is then increased to 540° C. over 2 hours and is kept at that temperature for 6 hours to calcine the as-synthesized SAPO-34 to remove the template. The reactor is cooled to 120° C., and a very low concentration of dry ammonia, e.g., a concentration in the range of about 1 to about 5%, mixed with an inert gas, typically helium, is passed through the freshly calcined catalyst bed/catalyst precursor to saturation. The reactor is then cooled to room temperature. The resultant stabilized NH$_4$-SAPO-34 is ion-exchanged using an aqueous copper acetate solution (or a like metal salt), which is then filtered and washed to obtain a stabilized Cu-SAPO-34.

Figure 3:
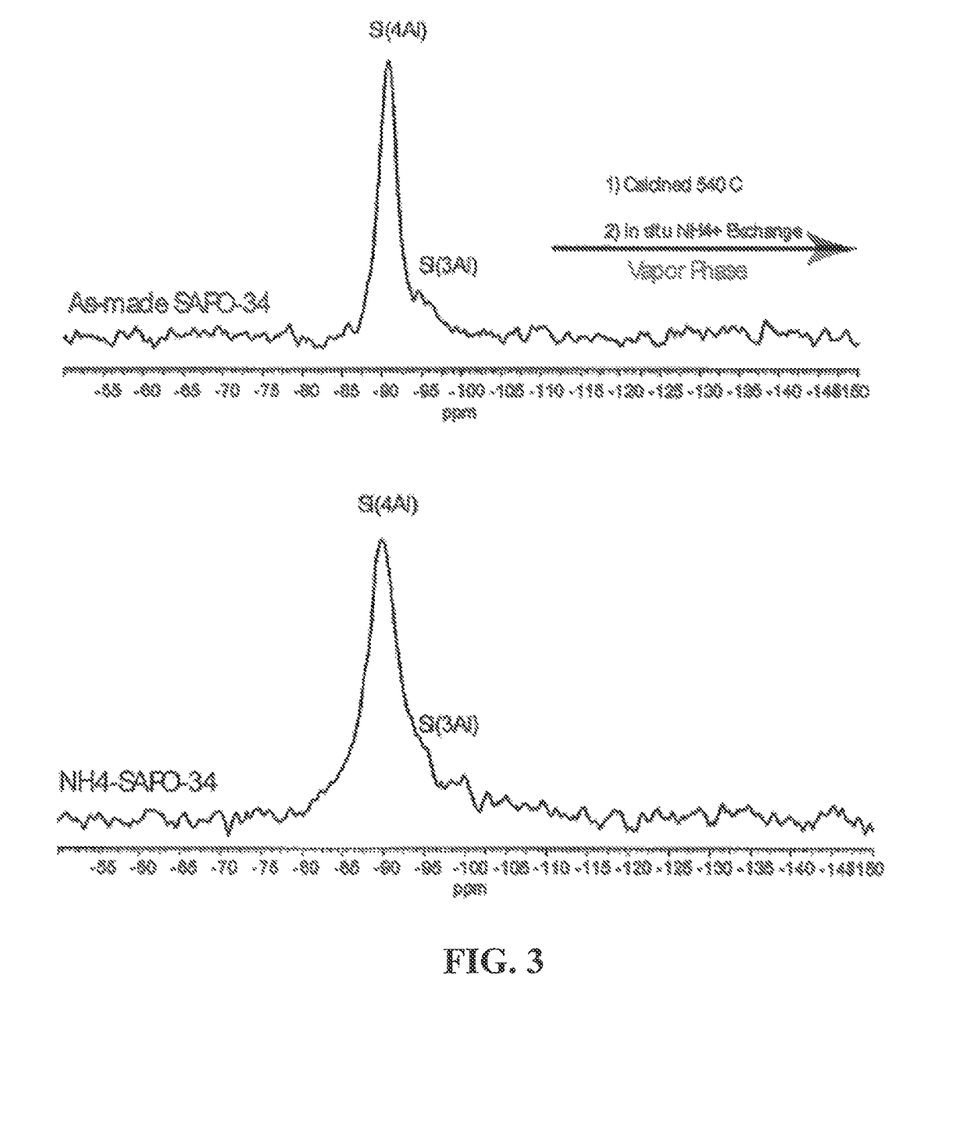
FIG. 3 is the Silicon-29 NMR spectrum of as-synthesized SAPO-34 and vapor-phase ammonium-stabilized SAPO-34 according to one or more embodiments.

As shown in FIG. 3, the silicon-29 NMR spectrum of the stabilized NH$_4$-SAPO-34 material shows that integrity of the local structure is preserved. The broadening of the peak is due to the interaction of nitrogen atoms within the framework silicon. Thus, stabilized NH$_4$-SAPO-34 is less prone to hydrolysis and could be readily exchanged with a metal salt, e.g. copper acetate, in an aqueous phase, even at an elevated temperature.

Wt % of Promoter Metal:

Generally, the promoter metal can be present in an amount of about 0.1 to 20% by weight of the catalyst material (the SAPO and the promoter metal), and more specifically in an amount of about 1 to 10% by weight, and more specifically between 2 and 8% by weight, and even more specifically 2 to 5% by weight. In one or more embodiments, the amount promoter metal is at least about 2 wt. % and in even more specific embodiments at least about 2.5 wt.-%, reported on a volatile-free basis. In one or more embodiment, the amount of promoter metal is about 4.3%. The promoter metal in specific embodiments is Cu, Fe or combinations thereof.

Promoter Metal Exchange to Form metal-SAPO:

Copper or another metal is ion exchanged into alkali metal or NH$_4$ SAPO material. In specific embodiments, copper is ion exchanged into NH$_4$-SAPO-34 to form Cu-SAPO-34. When copper acetate is used, the copper concentration of the liquid copper solution used in the copper ion-exchange is in specific embodiments in the range from about 0.01 to about 0.4 molar, more specifically in the range from about 0.05 to about 0.3 molar, even more specifically in the range from about 0.1 to about 0.25 molar, even more specifically in the range from about 0.125 to about 0.25 molar, even more specifically in the range from about 0.15 to about 0.225 molar and even more specifically in the range from about 0.2.

According to one or more embodiments, provided is a process for stabilizing a selective catalytic reduction catalyst material comprising a SAPO material, e.g., SAPO-34, and an exchanged metal. The process comprises exposing the SAPO material to dry ammonia and ion exchanging the SAPO material with a metal salt to provide a stabilized SAPO material. In one or more embodiments, the metal of the metal salt is selected from Ni, Co, Ce, Fe, and Cu. In a specific embodiment, the metal comprises Cu. In one or more embodiments, the SAPO material comprises SAPO-34.

In one or more embodiments, catalyst materials are disposed on a substrate to provide a catalytic article. The substrate may be any of those materials typically used for preparing catalysts, and will generally comprise a ceramic or metal having a honeycomb structure. Any suitable substrate may be employed, such as a monolithic substrate of the type having fine, parallel gas flow passages extending there through from an inlet or an outlet face of the substrate such that passages are open to fluid flow there through. The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 900 or more gas inlet openings (i.e. cells) per square inch of cross section.

The ceramic substrate may be made of any suitable refractory material, e.g. cordierite, cordierite-α-alumina, silicon nitride, zircon mullite, spodumene, alumina-silica-magnesia, zircon silicate, sillimanite, a magnesium silicate, zircon, petalite, α-alumina, an aluminosilicate and the like. The substrates useful for the catalyst carriers of embodiments of the present invention may also be metallic in nature and be composed of one or more metals or metal alloys. The metallic substrates may be employed in various shapes such as pellets, corrugated sheet or monolithic form. Specific examples of metallic substrates include the heat-resistant, base-metal alloys, especially those in which iron is a substantial or major component.

The substrate can also be a wall-flow filter substrate, where the channels are alternately blocked, allowing a gaseous stream entering the channels from one direction (inlet direction) to flow through the channel walls and exit from the channels from the other direction (outlet direction). The SCR catalyst materials can be coated on the flow through or wall-flow filter. If a wall flow substrate is utilized, the resulting system will be able to remove particulate matter along with gaseous pollutants. The wall-flow filter substrate can be made from materials commonly known in the art, such as cordierite, aluminum titanate, or silicon carbide.

In general, the selective catalytic reduction catalyst comprising a metal exchanged SAPO material comprising a plurality of substitutional sites consisting essentially of Si(4Al) sites and substantially free of Si(0Al) sites should exhibit both good low temperature NO$_x$ conversion activity (NO$_x$ conversion >50% at 200° C.) and good high temperature NO$_x$ conversion activity (NO$_x$ conversion >70% at 450° C.). The NO$_x$ activity is measured under steady state conditions at maximum NH$_3$-slip conditions in a gas mixture of 500 ppm NO$_x$, 500 ppm NH$_3$, 10% O$_2$, 5% H$_2$O, balance N$_2$ at a volume-based space velocity of 80,000 h$^{-1}$.

In one or more embodiments, the selective catalytic reduction catalyst comprises a metal exchanged SAPO material comprising a plurality of substitutional sites consisting essentially of Si(4Al) sites and substantially free of Si(0Al) sites. In one or more embodiments, the catalyst is substantially free of Si(0Al) sites. As used herein, the phrase "substantially free of Si(0Al) sites" means that there are no Si(0Al) sites intentionally added to the catalyst, and that there is generally less than about 5±1% of Si(0Al) sites in the catalyst. The amount of Si(0Al) sites, however, is dependent upon the silicon content. For catalysts containing >10% $SiO_2$ by weight, the amount of Si(0Al) sites is less than 5±1%. For catalysts with lower silicon content, e.g., <10% $SiO_2$, the amount of Si(0Al) sites is less than 1±1%. In one or more embodiments, there are less than 1% of Si(0Al) sites present in the catalyst. In one or more embodiments, there are no Si(0Al) sites present at all in the catalyst. Without intending to be bound by theory, it is thought that the increase in stability of the stabilized SAPO material is due to the lack of formation of extraneous Si(0Al) sites.

SCR Activity:

In specific embodiments, the catalyst materials and catalytic articles exhibit an aged $NO_x$ conversion at 200° C. of at least 50% measured at a gas hourly space velocity of 80000 $h^{-1}$. In specific embodiments the catalyst materials and catalytic articles exhibit an aged $NO_x$ conversion at 450° C. of at least 70% measured at a gas hourly space velocity of 80000 $h^{-1}$. More specifically the aged $NO_x$ conversion at 200° C. is at least 55% and at 450° C. at least 75%, even more specifically the aged $NO_x$ conversion at 200° C. is at least 60% and at 450° C. at least 80%, measured at a gas hourly volume-based space velocity of 80000 $h^{-1}$ under steady state conditions at maximum $NH_3$-slip conditions in a gas mixture of 500 ppm NO, 500 ppm $NH_3$, 10% $O_2$, 5% $H_2O$, balance $N_2$. The cores were hydrothermally aged in a tube furnace in a gas flow containing 10% $H_2O$, 10% $O_2$, balance $N_2$ at a space velocity of 4,000 $h^{-1}$ for 6 h at 850° C. The SCR activity measurement has been demonstrated in the literature, for example WO 2008/106519.

Method of Reducing $NO_x$:

Embodiments of the invention also relates to a method for selectively reducing nitrogen oxides ($NO_x$), wherein a gaseous stream containing nitrogen oxides ($NO_x$), for example, exhaust gas formed in an industrial process or operation, and in specific embodiments also containing ammonia and/or urea, is contacted with a composition or a selective catalytic reduction catalytic article containing the elective catalytic reduction catalyst comprising a metal exchanged SAPO material comprising a plurality of substitutional sites consisting essentially of Si(4Al) sites and substantially free of Si(0Al) sites according to embodiments of the invention.

The term nitrogen oxides, $NO_x$, as used in the context of embodiments of the invention designates the oxides of nitrogen, especially dinitrogen oxide ($N_2O$), nitrogen monoxide (NO), dinitrogen trioxide ($N_2O_3$), nitrogen dioxide ($NO_2$), dinitrogen tetroxide ($N_2O_4$), dinitrogen pentoxide ($N_2O_5$), nitrogen peroxide ($NO_3$).

The nitrogen oxides which are reduced using a composition or catalytic article containing the selective catalytic reduction catalyst comprising a metal exchanged SAPO material comprising a plurality of substitutional sites consisting essentially of Si(4Al) sites and substantially free of Si(0Al) sites according to embodiments of the invention may be obtained by any process, e.g. as a waste gas stream. Among others, waste gas streams as obtained in processes for producing adipic acid, nitric acid, hydroxylamine derivatives, caprolactame, glyoxal, methyl-glyoxal, glyoxylic acid, or in processes for burning nitrogeneous materials may be mentioned.

In specific embodiments, a composition or catalytic article containing the selective catalytic reduction catalyst comprising a metal exchanged SAPO material comprising a plurality of substitutional sites consisting essentially of Si(4Al) sites and substantially free of Si(0Al) sites is used for removal of nitrogen oxides ($NO_x$) from exhaust gases of internal combustion engines, in particular diesel engines, which operate at combustion conditions with air in excess of that required for stoichiometric combustion, i.e., lean.

Therefore, embodiments of the invention also relate to a method for removing nitrogen oxides ($NO_x$) from exhaust gases of internal combustion engines, in particular diesel engines, which operate at combustion conditions with air in excess of that required for stoichiometric combustion, i.e., at lean conditions, wherein a composition or catalytic article containing the selective catalytic reduction catalyst comprising a metal exchanged SAPO material comprising a plurality of substitutional sites consisting essentially of Si(4Al) sites and substantially free of Si(0Al) sites according to embodiments of the invention is employed.

Exhaust Gas Treatment System:

Embodiments of the invention relate to an exhaust gas treatment system comprising an exhaust gas stream optionally containing a reductant such as ammonia, urea and/or hydrocarbon, and in specific embodiments, ammonia and/or urea, and a selective catalytic reduction catalytic article containing the selective catalytic reduction catalyst comprising a metal exchanged SAPO material comprising a plurality of substitutional sites consisting essentially of Si(4Al) sites and substantially free of Si(0Al) sites, disposed on a substrate, and a second exhaust gas treatment component, for example, a soot filter and a diesel oxidation catalyst.

The soot filter, catalyzed or non-catalyzed, may be upstream or downstream of said catalytic article. The diesel oxidation catalyst in specific embodiments is located upstream of said catalytic article. In specific embodiments, said diesel oxidation catalyst and said catalyzed soot filter are upstream from said catalytic article. In a more specific embodiment, the system comprises in order, the diesel oxidation catalyst, a soot filter (catalyzed or non-catalyzed) and the catalytic article (SCR catalytic article). A reductant injector to add reductant to the system is typically positioned immediately upstream of the SCR catalytic article. As is known in the art, the diesel oxidation catalyst comprises a platinum group metal such as platinum, palladium, rhodium or combinations thereof on a carrier of a refractory metal oxide such as alumina as a washcoat on a flow through substrate. The soot filter is typically a wall flow filter, and a catalyzed soot filter comprises a washcoat of a refractory metal oxide and a platinum group metal on the walls of the wall flow filter.

In specific embodiments, the exhaust is conveyed from the diesel engine to a position downstream in the exhaust system, and in more specific embodiments, containing $NO_x$, where a reductant is added and the exhaust stream with the added reductant is conveyed to the catalytic article.

For example, a catalyzed soot filter, a diesel oxidation catalyst and a reductant are described in WO 2008/106519 which is incorporated by reference. In specific embodiments, the soot filter comprises a wall-flow filter substrate, where the channels are alternately blocked, allowing a gaseous stream entering the channels from one direction (inlet direction), to flow through the channel walls and exit from the channels from the other direction (outlet direction).

An ammonia oxidation catalyst (AMOX) may be provided downstream of the catalytic article to remove any slipped ammonia from the system. In specific embodiments, the AMOX catalyst may comprise a platinum group metal such as platinum, palladium, rhodium or combinations thereof. In more specific embodiment, the AMOX catalyst can include a washcoat containing a selective catalytic reduction catalyst comprising a metal exchanged SAPO material comprising a plurality of substitutional sites consisting essentially of Si(4Al) sites and substantially free of Si(0Al) sites.

Such AMOX catalysts are useful in exhaust gas treatment systems including an SCR catalyst. As discussed in commonly assigned U.S. Pat. No. 5,516,497, the entire content of which is incorporated herein by reference, a gaseous stream containing oxygen, nitrogen oxides and ammonia can be sequentially passed through first and second catalysts, the first catalyst favoring reduction of nitrogen oxides and the second catalyst favoring the oxidation or other decomposition of excess ammonia. As described in U.S. Pat. No. 5,516,497, the first catalysts can be a SCR catalyst comprising a zeolite and the second catalyst can be an AMOX catalyst comprising a zeolite.

The use of the terms "a" and "an" and "the" and similar referents in the context of describing the materials and methods discussed herein (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the materials and methods and does not pose a limitation on the scope unless otherwise claimed. No language in the specification should be construed as indicating any non-claimed element as essential to the practice of the disclosed materials and methods.

The invention is now described with reference to the following examples. Before describing several exemplary embodiments of the invention, it is to be understood that the invention is not limited to the details of construction or process steps set forth in the following description. The invention is capable of other embodiments and of being practiced or being carried out in various ways.

EXAMPLES

Example 1—Preparation of As-Synthesized SAPO-34

A SAPO-34 was prepared from a gel composition of 1.0 $Al_2O_3$:0.85 $P_2O_5$:0.60 $SiO_2$:3.0 R:32 $H_2O$. A reaction mixture was prepared by mixing 45 kg of deionized water and 18.76 kg of phosphoric acid. This was followed by the addition of 10.80 kg of Catapal B alumina to the acid solution over 45 minutes. The alumina digestion was continued for 2 hrs with intensive stirring. Then 22.74 kg of morpholine was added over a period of 60 minutes. An additional 0.3 kg of water was used at this stage. Upon addition of morpholine, the temperature rose to approx. 46° C. The slurry was cooled down to approximately 28° C. before the next addition. Then, 7.76 kg of Ludox AS 40 colloidal silica was added, as well as an additional 0.50 kg of deionized water. The resulting gel was transferred to a 30 gallon reactor and an additional 2.20 kg of deionized water was added. The reactor temperature was ramped up to 170° C. within 8 hours, and held at this temperature for 48 hours. The crystalline product was recovered via filtration and was washed to a conductivity lower than 200 f·LScm$^{-1}$. This product is referred to as the as-synthesized SAPO-34. The crystalline product after calcinations at 540° C. for 6 hours, had an X-ray powder diffraction pattern indicating that it was SAPO-34, a non-zeolitic molecular sieve with the chabazite topology.

The elemental analysis of the calcined product showed 15.5% $SiO_2$, 40.3% $Al_2O_3$, and 44.2% $P_2O_5$. The BET surface area was 583 m$^2$/g.

Example 2—Preparation of Stabilized $NH_4$-SAPO-34

Stabilized $NH_4$-SAPO-34 is prepared by in situ introduction of ammonium into SAPO-34 prepared in accordance with Example 1. The SAPO-34 filter cake obtained in Example 1 was crushed and then calcined at 540° C. for 6 h. The sample was then cooled to 120° C. A low concentration of dry ammonia (about 1-5%) mixed with an inert gas (helium) was passed through the SAPO-34 bed to saturation to provide stabilized $NH_4$-SAPO-34.

Example 3—Preparation of Stabilized Cu-SAPO-34

Copper is incorporated into the stabilized $NH_4$-SAPO-34 obtained in Example 2 by Cu-ion exchange at 80° C. for 2 hours at pH 4. The mixture is then washed with deionized water, filtered, and vacuum/air dried to provide the stabilized Cu-SAPO-34.

Example 4—Preparation of Washcoat Containing Cu-SAPO-34

The stabilized Cu-SAPO-34 slurry obtained in Example 3 is then pH is adjusted to 4.5 with 15% ammonium hydroxide solution. The mixture is then coated onto substrates to a washcoat loading of 3 g/in$^3$. The washcoat is dried under air at 130° C. for 5 min. A second coat is then applied. No calcination is required between coats. After the final coating, the substrate is calcined at 450° C. for 1 hour to provide a catalytic article comprising the stabilized Cu-SAPO-34 washcoated on a substrate.

Example 5—Silicon-29 NMR Study

Nuclear Magnetic Resonance (NMR) spectroscopy using a 9.4 T superconducting magnet was used as the method to study the proposed hydrolysis mechanism because NMR determines local order (or disorder) or solids at an atomic level. In as-synthesized SAPO-34, the silicon-29 NMR spectrum is dominated by Si(4Al) species indicating the presence of mostly isolated acid sites (see FIG. 2A)

NMR data also indicates that as-synthesized SAPO-34 in its calcined and hydrated state retains the spectral features even after one year (albeit losing its structural integrity to an extent by the initial hydrolysis). (see FIG. 2B). Partial hydrolysis of the structure has occurred. Furthermore, when the hydrated sample is dried in an oven at 100° C., the hydroxyl groups condense to form additional linkages (see FIG. 2C) to form Si(3Al), Si(2Al), Si(1Al), and ultimately Si(0Al), i.e., the so called silicon islands.

It is proposed that the loss of activity reported for Cu-SAPO-34 in SCR below 100° C. is due to the irreversible (and repetitive) hydrolysis and subsequent condensation to generate an inactive framework, a process initiated even prior to the cation exchange in the aqueous phase.

With the in-situ ammonium exchange in the vapor phase (Example 2), the Silicon-29 NMR spectrum of the stabilized $NH_4$-SAPO-34 shows that integrity of the local structure is conserved. (See FIG. 3). The apparent broadening of the peak is due to the interaction of the nitrogen atom with the framework silicon. Thus, stabilized $NH_4$-SAPO-34 is less prone to hydrolysis and could be readily exchanged by copped acetate in an aqueous phase, even at an elevated temperature of 70° C.

Comparative Example 6—(Cu-SSZ-13)

A sample of Na-SSZ-13 was prepared by traditional hydrothermal methods using a source of silica, a source of alumina, and a structure directing agent, which are mixed under alkaline aqueous conditions. The reaction mixture was heated in a pressure vessel with stifling to yield the crystalline SSZ-13 product. At the conclusion of the reaction, the pH was adjusted to between 6 and 10, and the product was filtered and washed with water. The solid product was thermally treated in air or nitrogen at a temperature in range of the 400° C. to 850° C.

The obtained Na-SSZ-13 was $NH_4$-exchanged to form $NH_4$-SSZ-13. Copper was then ion exchanged into the $NH_4$-SSZ-13 to form Cu-SSZ-13 through the use of copper acetate.

Example 7—$NO_x$ Conversion

Figure 4:
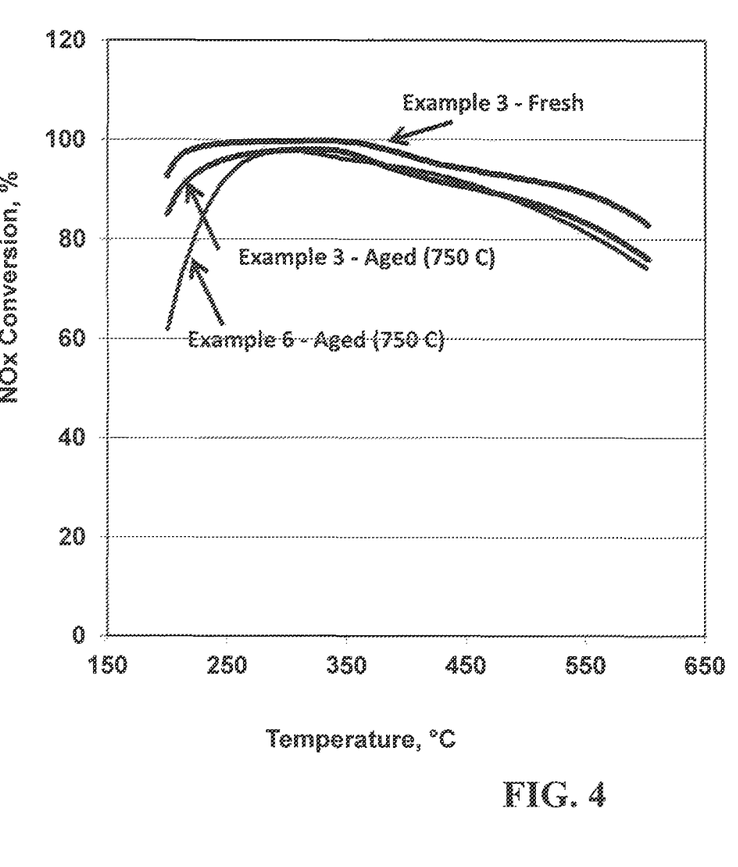
FIG. 4 is a graph of the $NO_x$ conversion for materials prepared according to the Examples.

Example 3 and Example 6 were tested for SCR performance. The samples were aged at 750° C. for 5 hours with 10% $H_2O$ in air. Referring to FIG. 4, the fresh stabilized Example 3 catalyst shows greater than 80% $NO_x$ conversion across the entire temperature range. The stabilized Example 3 catalyst gives considerably higher $NO_x$ conversion at 200° C. and at 600° C. versus the Comparative example 6. Thus, in the fresh and aged states, the difference in SCR activity between Comparative Example 6 (60% at 200° C., and 77% at 600° C.) and Example 3 prepared according to one or more embodiments is considerable. The increased SCR activity of the stabilized Cu-SAPO-34 material (Example 3) makes it an attractive target material for improved SCR technology.

Example 8—$NO_x$ Conversion Upon Exposure to Water

Figure 5:
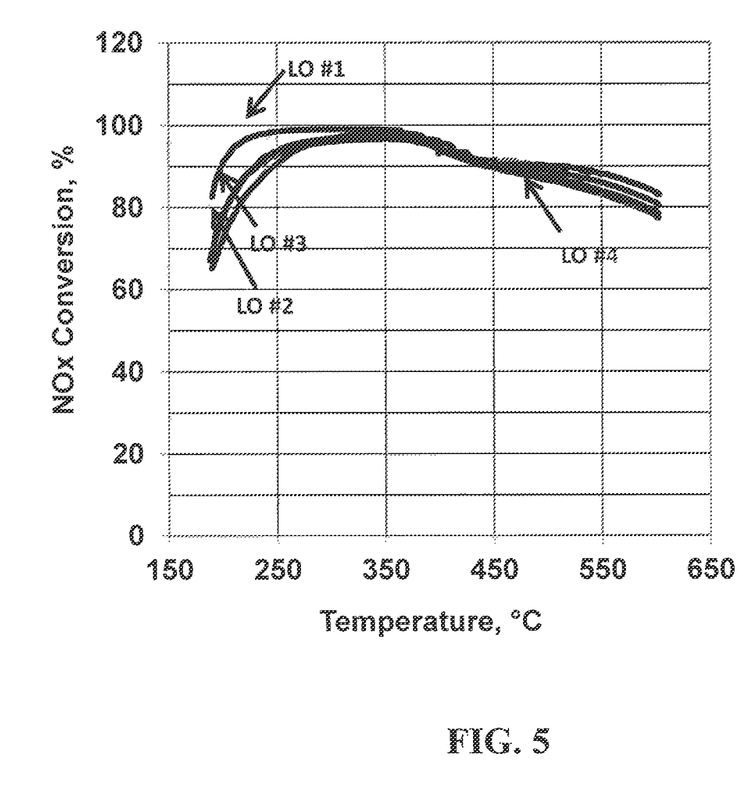
FIG. 5 is a graph of the $NO_x$ conversion for materials prepared according to the Examples.

The $NO_x$ conversion activity of Example 3 was tested prior to exposure to water (LO#1). Example 3 was kept in a reactor, where it was exposed to moisture at 70° C. for 24 hours. In other words, after the completion of the catalytic test (LO#1), the sample was allowed to cool down to 70° C. within two hours and was kept at 70° C. for 24 hours, while a total flow of 5% $H_2O$ in 10% oxygen in nitrogen was maintained (NO and $NH_3$ were turned off). After being exposed to moisture, the SCR test was repeated three times (LO #2-4). In between the three sample tests, the sample was allowed to cool to 200° C. The SCR tests were carried out using 500 ppm NO, 500 ppm $NH_3$, 5% $H_2O$, 10% $O_2$ (as air), with the balance being $N_2$, and at a space velocity of 80,000/h. Referring to FIG. 5, when the catalyst of Example 3 is treated under low temperature (70° C.) in moist conditions, there is some loss in activity. A decrease in $NO_x$ conversion from about 80% to about 70% at 200° C. is observed. However, the $NO_x$ conversion values are still significantly greater than that observed for the Comparative Example 6. Accordingly, in light of the high stability exhibited by the stabilized Cu-SAPO-34 (Example 3) material at hydrothermal conditions of 70° C., it is evident that the structure of the silicoaluminophosphate remains stable and does not deactivate.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A process for stabilizing a selective catalytic reduction catalyst material comprising a SAPO material and an exchanged metal, the process comprising:
   exposing the SAPO material to dry ammonia; and
   ion exchanging the SAPO material with a metal salt to provide a stabilized SAPO material.

2. The process of claim 1, wherein the metal of the metal salt is selected from the group consisting of Cu, Fe, Co, Ce and Ni.

3. The process of claim 2, wherein the metal comprises copper.

4. The process of claim 3, wherein the SAPO material comprises SAPO-34.

5. The process of claim 1, wherein the stabilized SAPO material comprises a plurality of substitutional sites consisting essentially of Si(4Al) sites and substantially free of Si(0Al) sites.

6. The process according to claim 5, wherein the plurality of substitutional sites includes less than 5% Si(0Al) sites.

7. The process according to claim 5, wherein the plurality of substitutional sites includes less than 1% Si(0Al) sites.

8. The process according to claim 1, wherein the SAPO material has a structure type selected from the group consisting of AEI, AFT, AFX, CHA, EAB, ERI, KFI, LEV, SAS, SAT, and SAV.

9. The process according to claim 8, wherein the SAPO material has the CHA structure type.

10. The process according to claim 9, wherein the SAPO material is selected from the group consisting of SAPO-34, SAPO-44, and SAPO-47.

11. The process according to claim 1, wherein the metal is Cu present at a loading in the range of 2 and 8% by weight.

* * * * *

UNITED STATES PATENT AND TRADEMARK OFFICE
CERTIFICATE OF CORRECTION

PATENT NO. : 9,931,620 B2
APPLICATION NO. : 15/720567
DATED : April 3, 2018
INVENTOR(S) : Subramanian Prasad, Martin C. Wende and Jaya L. Mohanan

It is certified that error appears in the above-identified patent and that said Letters Patent is hereby corrected as shown below:

On the Title Page

Column 2, item (56), references cited, other publications, delete "Lopez et al., "A study of the influence of the synthesis conditions upon the catalytic properties of silicoaluminophosphate molecular sieves", Topics in Catalysis 10 (2002), pp. 65-71." and insert --Lopez et al., "A study of the influence of the synthesis conditions upon the catalytic properties of silicoaluminophosphate molecular sieves", Topics in Catalysis 10 (2000), pp. 65-71.--, therefor.

Page 2, Column 1, item (56), references cited, other publications, delete "Tan et al., "Crystallization and Si incorporation mechanisms of SAPO-34", Microporous and Mesoporous Materials 53 (2003), pp. 97-108." and insert --Tan et al., "Crystallization and Si incorporation mechanisms of SAPO-34", Microporous and Mesoporous Materials 53 (2002), pp. 97-108.--, therefor.

Signed and Sealed this
Twelfth Day of June, 2018

Andrei Iancu
*Director of the United States Patent and Trademark Office*